United States Patent
Cheng

(10) Patent No.: US 11,438,794 B2
(45) Date of Patent: Sep. 6, 2022

(54) RADIO LINK MONITORING IN SIDELINK COMMUNICATIONS

(71) Applicant: MEDIATEK INC., Hsinchu (TW)

(72) Inventor: Ming-Yuan Cheng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 115 days.

(21) Appl. No.: 16/861,604

(22) Filed: Apr. 29, 2020

(65) Prior Publication Data

US 2020/0351707 A1     Nov. 5, 2020

Related U.S. Application Data

(60) Provisional application No. 62/841,884, filed on May 2, 2019.

(51) Int. Cl.
*H04W 28/04* (2009.01)
*H04W 76/14* (2018.01)

(52) U.S. Cl.
CPC ........... *H04W 28/04* (2013.01); *H04W 76/14* (2018.02)

(58) Field of Classification Search
CPC .............................. H04W 28/04; H04W 76/14
See application file for complete search history.

(56) References Cited

U.S. PATENT DOCUMENTS

| | | | |
|---|---|---|---|
| 2018/0212746 A1 | 7/2018 | Kazmi et al. | |
| 2018/0279275 A1 | 9/2018 | Chen et al. | |
| 2020/0029384 A1 | 1/2020 | Hong et al. | |
| 2020/0127768 A1* | 4/2020 | Seo | H04B 7/0626 |

(Continued)

FOREIGN PATENT DOCUMENTS

| | | |
|---|---|---|
| CN | 101047646 A | 10/2007 |
| CN | 105530591 A | 4/2016 |
| CN | 107925524 A | 4/2018 |

(Continued)

OTHER PUBLICATIONS

LG Electronics, Discussion on transmitter UE side RLM and RLF in NR SL, R2-1904223, 3GPP TSG-RAN WG2 Meeting #105bis, Xian, China, Apr. 8-12, 2019. (Year: 2019).*

(Continued)

*Primary Examiner* — Brian P Cox

(74) *Attorney, Agent, or Firm* — Oblon, McClelland, Maier & Neustadt, L.L.P.

(57) ABSTRACT

A method of radio link monitoring (RLM) can include performing a physical sidelink shared channel (PSSCH) transmission over a radio link between a Tx UE and a Rx UE in sidelink communications, receiving a HARQ feedback status corresponding to the PSSCH transmission from a physical layer, incrementing a count of a number of consecutive HARQ failure indications (e.g., represented by HARQ DTX) received for PSSCH transmissions over the radio link between the Tx UE and the Rx UE by 1 when the received HARQ feedback status is a HARQ failure indication, declaring a radio link failure (RLF) for the radio link between the Tx UE and the Rx UE when the count of the number of consecutive HARQ failure indications reaches a threshold, and resetting the count of the number of consecutive HARQ failure indications to 0 when the received HARQ feedback status is not a HARQ failure indication.

20 Claims, 7 Drawing Sheets

(56) References Cited

U.S. PATENT DOCUMENTS

2020/0228951 A1* 7/2020 Chun .................... H04W 76/30

FOREIGN PATENT DOCUMENTS

| WO | WO 2018/064483 A1 | 4/2018 | | |
|---|---|---|---|---|
| WO | WO 2018/182286 A1 | 10/2018 | | |
| WO | WO-2019004883 A1 * | 1/2019 | ........... | H04L 1/1819 |
| WO | WO-2019035698 A1 * | 2/2019 | ............. | H04W 4/70 |
| WO | WO-2020056068 A1 * | 3/2020 | ........... | H04L 1/1861 |

OTHER PUBLICATIONS

Combined Taiwanese Office Action and Search Report dated May 11, 2021 in Patent Application No. 109114530 (with English translation of Category of Cited Documents), 5 pages.
Huawei, et al., "Introduction of Bluetooth and WLAN measurement collection in MDT," 3GPP TSG RAN Meeting #81, RP-182000, Sep. 2018, 97 pages.
Huawei, et al., "Introduction of eV2X in TS 36.331," 3GPP TSG-RAN WG2 Meeting #102, R2-1808917, May 2018, 80 pages.
English translation of the International Search Report and Written Opinion of the International Searching Authority dated Jul. 30, 2020 in PCT/CN2020/088310, 9 pages.

* cited by examiner

RADIO LINK MONITORING IN SIDELINK COMMUNICATIONS

INCORPORATION BY REFERENCE

This present application claims the benefit of U.S. Provisional Application No. 62/841,884, "New RLF Trigger Condition in Sidelink" filed on May 2, 2019, which is incorporated herein by reference in its entirety.

TECHNICAL FIELD

The present disclosure relates to wireless communications, and specifically relates to radio link monitoring in sidelink communications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cellular based vehicle-to-everything (V2X)(e.g., LTE V2X or NR V2X) is a radio access technology developed by the Third Generation Partner Project (3GPP) to support advanced vehicular applications. In V2X, a direct radio link (referred to as a sidelink) can be established between two vehicles. The sidelink can operate under the control of a cellular system (e.g., radio resource allocation) when the vehicles are within the coverage of the cellular system. Or, the sidelink can operate independently when no cellular system is present.

SUMMARY

Aspects of the disclosure provide a method of radio link monitoring (RLM). The method can include performing a physical sidelink shared channel (PSSCH) transmission over a radio link between a transmitter (Tx) UE and a receiver (Rx) UE in sidelink communications, receiving a hybrid automatic repeat request (HARQ) feedback status corresponding to the PSSCH transmission from a physical layer at the Tx UE, determining whether the expected HARQ feedback status is a HARQ failure indication, incrementing a count of a number of consecutive HARQ failure indications (e.g, represented by HARQ DTX) received for PSSCH transmissions over the radio link between the Tx UE and the Rx UE by 1 when the HARQ feedback status is the HARQ failure indication, declaring a radio link failure (RLF) for the radio link between the Tx UE and the Rx UE when the count of the number of consecutive HARQ failure indications (e.g., HARQ DTX) reaches a threshold (e.g., indicated by a parameter denoted by maxNumConsecutiveDTX), and resetting the count of the number of consecutive HARQ failure indications (e.g., HARQ DTX) to 0 when the expected HARQ feedback status is not a HARQ failure indication (e.g., HARQ DTX).

In an embodiment, the received HARQ feedback status is one of an HARQ ACK, an HARQ NACK, or an HARQ DTX. In an embodiment, the HARQ DTX is used as the HARQ failure indication. In an embodiment, the HARQ NACK is used as the HARQ failure indication. In an embodiment, the HARQ NACK and the HARQ DTX are each used as the HARQ failure indication. In an embodiment, radio link between the Tx UE and the Rx UE is associated with a source layer-2 ID corresponding to the Tx UE and a destination layer-2 ID corresponding to the Rx UE. In an embodiment, the threshold is configured to the Tx UE through RRC signaling, SIB broadcasting, or pre-configuration.

Aspects of the disclosure provide an apparatus of RLM. The apparatus can include circuitry configured to perform a PSSCH transmission over a radio link between a Tx UE and a Rx UE in sidelink communications, receive a HARQ feedback status corresponding to the PSSCH transmission from a physical layer at the Tx UE, determine whether the received HARQ feedback status is a HARQ failure indication, increment a count of a number of consecutive HARQ failure indications received for PSSCH transmissions over the radio link between the Tx UE and the Rx UE by 1 when the received HARQ feedback status is the HARQ failure indication, declare a RLF for the radio link between the Tx UE and the Rx UE when the count of the number of consecutive HARQ failure indications reaches a threshold, and reset the count of the number of consecutive HARQ failure indications to 0 when the received HARQ feedback status is not a HARQ failure indication.

Aspects of the disclosure provide a non-transitory computer-readable medium storing instructions that, when executed by a processor, cause the processor to perform the method of RLM.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
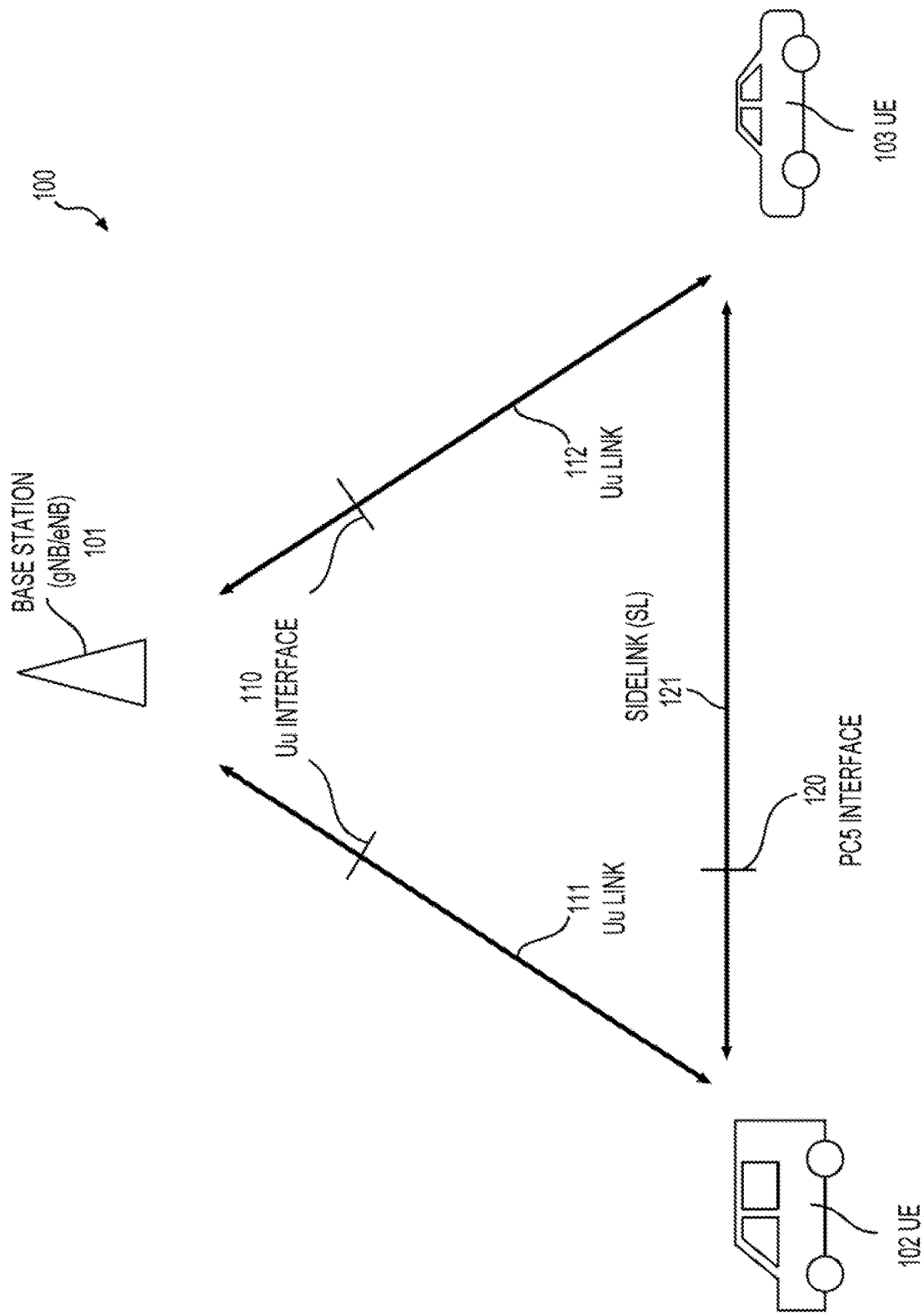
FIG. 1 shows a wireless communication system 100 according to an embodiment of the disclosure.

FIG. 1 shows a wireless communication system 100 according to an embodiment of the disclosure. The system 100 can include a base station (BS) 101, a first user equipment (UE) 102, and a second UE 103. The BS 101 can be an implementation of a gNB as specified in the 3rd Generation Partnership Project (3GPP) New Radio (NR) standards, or can be an implementation of an eNB as specified in 3GPP Long Term Evolution (LTE) standards. Accordingly, the BS 101 can communicate with the UE 102 or 103 via a radio interface 110 (referred to as a Uu interface 110) according to respective wireless communication protocols. Alternatively, the BS 101 may implement other types of standardized or non-standardized radio access technologies, and communicate with the UE 102 or 103 according to the respective radio access technologies. The UE 102 or 103 can be a vehicle, a computer, a mobile phone, a roadside unit, and the like.

The UEs 102 and 103 can communicate with each other via a radio interface 120 (referred to as a PC5 interface) based on vehicle-to-everything (V2X) technologies as specified in 3GPP standards. A direct radio link 121, referred to as a sidelink (SL), can be established between the UEs 102 and 103. The UE 102 can use a same spectrum for uplink transmissions over a Uu link 111 and sidelink transmissions over the sidelink 121. Similarly, the UE 103 can use a same spectrum for uplink transmissions over a Uu link 112 and SL transmissions over the sidelink 121. In addition, allocation of radio resources over the sidelink 121 can be controlled by the BS 101.

Different from the FIG. 1 example (in-coverage scenario) where the UEs 102 and 103 performing sidelink communications are under network coverage (the coverage of a cell of the BS 101), in other examples, UEs performing sidelink communications can be outside of network coverage. For example, a sidelink can be established between two UEs both of which are located outside of network coverage (out-of-coverage scenario), or one of which is located outside of network coverage (partial-coverage scenario).

In some examples, a group of UEs (such as the UEs 102 and 103) in a local area may communicate with each other using sidelinks under or without control of a base station. Each UE in the group may periodically or aperiodically transmits messages to neighboring UEs. In addition, the respective transmissions can be unicast, groupgast, or broadcast. For example, hybrid automatic repeat request (HARQ) and link adaptation mechanisms can be employed to support unicast or groupcast between the Tx UE and a target UE(s). In sidelink groupcast or unicast, a source layer-2 identifier (ID) can be associated with the Tx UE, and a destination layer-2 ID can be associated with the target Rx UEs (in groupcast) or one target Rx UE (in unicast). Based on the destination layer-2 ID, a Rx UE can determine if a packet data transmitted over a sidelink is intended for the Rx UE.

While in data transmission and reception operation, the UE 102 can perform radio link monitoring (RLM) to monitor qualities of radio links. For example, the UE 102 can monitor qualities of the radio links between the UE 102 and the BS 101, or between the UE 102 and other UEs communicating with the UE 102. When the quality of a radio link is below a predefined level (a triggering condition is satisfied), a radio link failure (RLF) can be declared. Upon the RLF takes place, the UE 102 can perform a radio link recovery process to reestablish a radio link between the UE 102 and a target device (either the BS 101 or a UE). If the radio link recovery process is not successful, the UE 102 may stop data transmissions to the target device to save power and to reduce interference to other communications in the neighborhood of the UE 102.

In various examples, various triggering conditions for RLF can be adopted for RLM. For example, the following RLF triggering conditions can be used for RLM of a radio link between the UE 102 and the BS 101 over the Uu interface 110: upon indication from radio link control (RLC) layer that a maximum number of retransmissions has been reached; upon expiry of Timer T310 which is triggered upon receiving N310 consecutive out-of-sync indications from physical layer; or, upon a random access problem indication from medium access control (MAC) layer while neither T300, T301, T304 nore T311 is running.

Figure 2:
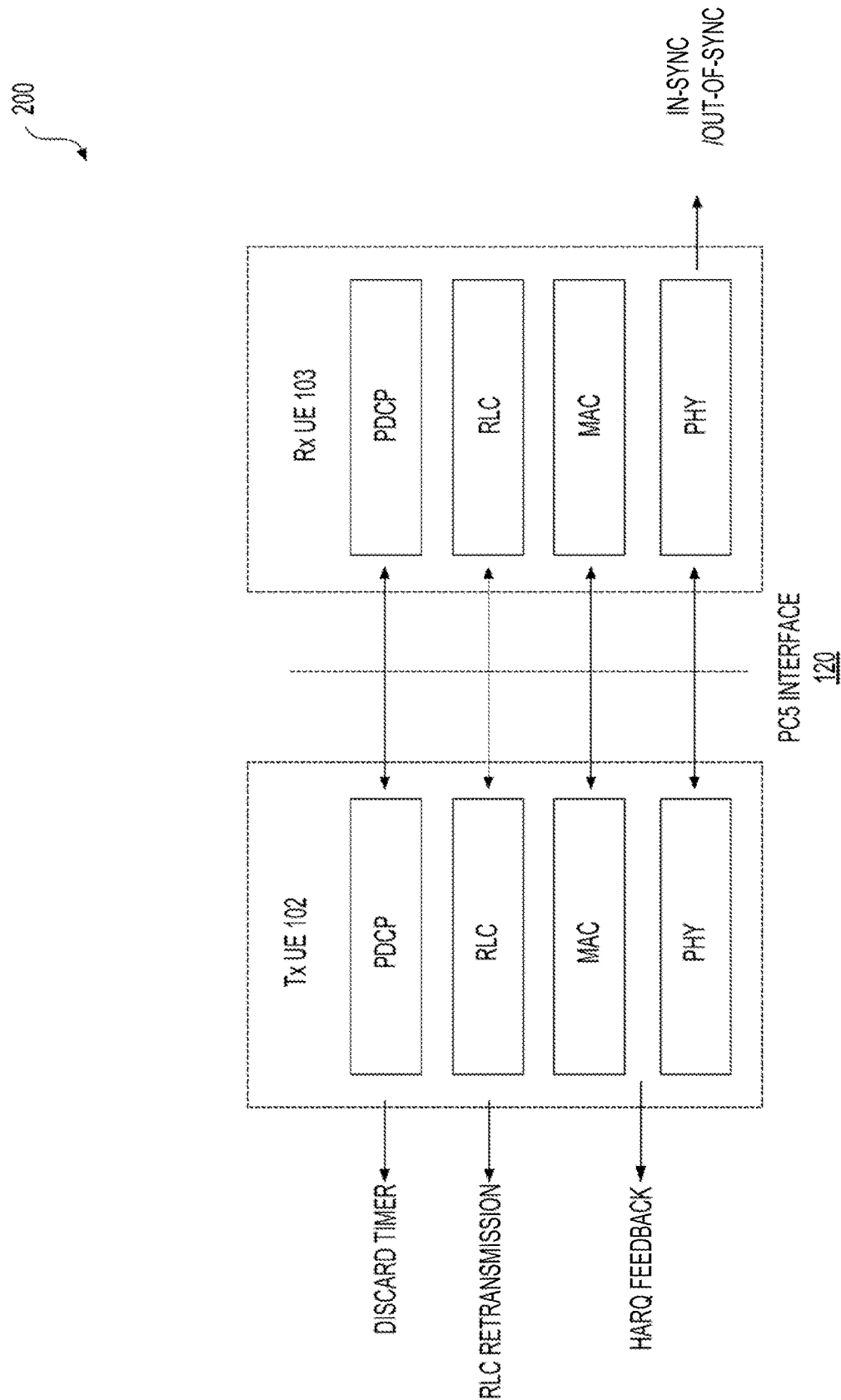
FIG. 2 shows different radio link failure (RLF) triggering conditions for sidelink radio link monitoring (RLM) with reference to a sidelink protocol stack 200 according to some embodiments of the disclosure.

FIG. 2 shows different RLF triggering conditions for sidelink RLM with reference to a sidelink protocol stack 200 according to some embodiments of the disclosure. A radio link between the UE 102 as a transmitter (Tx) and the UE 103 as a receiver (Rx) over the PC5 interface 120 is used as an example for explaining the different RLF triggering conditions. As shown, the sidelink protocol stack 200 at the Tx UE 102 or the Rx UE 103 can include a physical (PHY) layer, a MAC layer, a RLC layer, and a packet data convergence protocol (PDCP) layer. Events occurring in different levels of the sidelink protocol stack 200 can be used as the bases of different RLF triggering conditions in different embodiments.

In an embodiment, at the Rx UE 103, counting of in-sync or out-of-sync indications provided from the PHY layer is used for triggering a RLF. In an embodiment, at the Tx UE 102, a count of expired discard timers at the PDCP layer is used as a RLF triggering condition. For example, the UE 102 can count how many PDCP service data units (SDU) are not delivered successfully when a respective discard timer expires. In an embodiment, at the Tx UE 102, a number of RLC retransmissions at the PDCP layer is used as a RLF triggering condition.

In some embodiments, at the side of the Tx UE 102, hybrid automatic repeat request (HARQ) feedbacks provided from the PHY layer are used as the basis for triggering RLF. For example, the Tx UE 102 can use a HARQ mechanism for data transmission to the Rx UE 103. A HARQ entity at the MAC layer of the Tx UE 102 can include a set of stop-and-wait processes operating in parallel. Each stop-and-wait process can transmit a transport block, and stops and waits for a HARQ feedback from the Rx UE corresponding to the transmission of the transport block. The transport block can be carried in a physical sidelink shared channel (PSSCH) that is scheduled by a physical sidelink control channel (PSCCH).

In an example, at the Rx UE 103, in order to receive transport block, the Rx UE 103 can monitor some preconfigured locations in a time-frequency radio resource grid, and try to detect the PSCCH that schedules the PSSCH. When the PSCCH is detected successfully, the Rx UE 103 can proceed to decode the PSSCH based on scheduling information carried in the PSCCH. Subsequently, the Rx UE 103 can transmit a positive acknowledgement (ACK) or a negative acknowledgement (NACK) to the Tx UE 102 to indicate whether the transport block is correctly decoded or not. If a NACK is received, retransmission of the transport block can be performed at the Tx UE 102. When the Rx UE 103 fails to detect the PSCCH, for example, because the Rx UE 103 is too far away from the Tx UE 102, or a severer interference over the radio link between the Rx UE 103 and the Tx UE 102, no HARQ feedback would be provided from the Rx UE 103 to the Tx UE. Such a particular HARQ feedback status of no-feedback is referred to as a discontinuous transmission (DTX).

Accordingly, there can be three types of HARQ feedbacks: ACK, NACK, or DTX. Each type of HARQ feedback can be referred to as a HARQ status, such as an ACK status, a NACK status, or a DTX status. In some embodiments, the PHY layer can provide the HARQ feedback status (ACK, NACK or DTX) to the MAC layer. At the MAC layer, one or more types of HARQ feedback status (e.g., NACK or DTX) can be used as RLF indications for triggering a RLF. Such HARQ feedback status can be referred to as HARQ-based RLF indications, or HARQ failure indications.

For example, a count of received number of HARQ NACKs can be used for triggering a RLF. When the Rx UE 103 can detect the PSCCH but cannot correctly decode the PSSCH, the Rx UE 103 will feedback a HARQ NACK. When no link adaptation is used, more frequent HARQ NACKs can indicate deterioration of the radio link between the Tx UE 102 and Rx UE 103. When link adaptation is employed, after a lowest modulation level is used, frequently receiving of HARQ NACKs can indicate the quality of the radio link is worsening.

For another example, a count of received number of NACKs plus DTXs (no-feedbacks) can be used for triggering a RLF. When the Rx UE 103 cannot detect the PSCCH, the Rx UE 103 can miss the scheduling information for the PSSCH, and thus will not provide ACK or NACK feedback. As a result, the MAC layer can receive a DTX status from the PHY layer, which can indicate a worse condition of the radio link than receiving a NACK. Thus, the NACK status and the DTX status can be combined together to reflect the quality of the radio link between the Tx UE 102 and the Rx UE 103.

For a further example, a count of received number of DTXs (no-feedbacks) can be used for triggering a RLF. The DTX status can indicate a quality of the radio link that the PSCCH cannot be correctly decoded. The DTX status itself can be used as the HARQ failure indication for triggering a RLF.

A Tx UE in unicast sidelink communications may maintain multiple radio links with multiple Rx UEs simultaneously. Those radio links can each be identified with a pair of source layer-2 ID and destination layer-2 ID. The RLM can be performed separately with individual radio links. Accordingly, in HARQ-based RLM/RLF triggering mechanisms disclosed herein, a count of a number of received HARQ failure indications can be associated with a pair of source layer-2 ID and destination layer-2 ID that identifies a respective unicast radio link. Similarly, a count of a number of received HARQ failure indications can also be associated with a pair of source layer-2 ID and destination layer-2 ID that identifies radio links of a respective groupcast.

One RLF triggering condition not shown in the FIG. 2 example is to count a number of sent HARQ feedback at the Rx UE 103. For example, when the Rx UE 103 becomes out of range of the Tx UE 102, and sends a HARQ NACK feedback to the Tx UE 102, the Rx UE 103 may not receive a response (e.g., a retransmission) from the Tx UE 102. The Rx UE 103 may repeatedly transmit a HARQ NACK. The number of the repeatedly transmitted HARQ NACK feedback can be used for triggering a RLF.

Figure 3B:
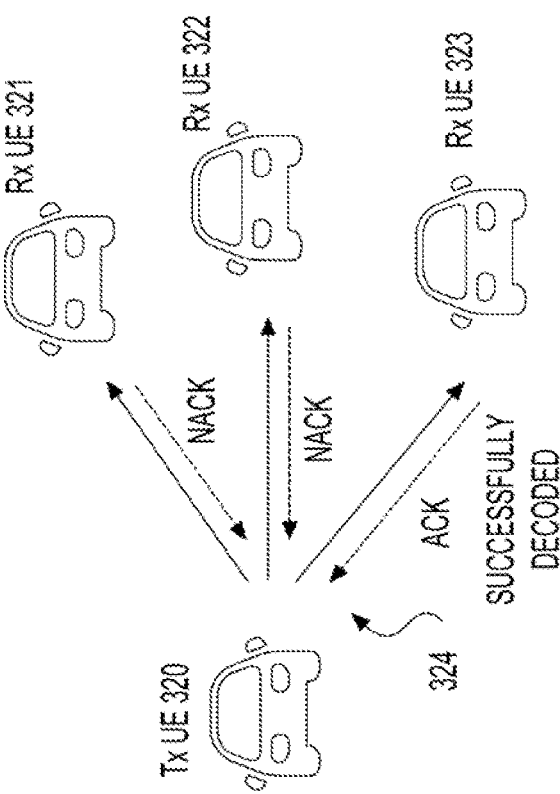
FIGS. 3A-3B show examples of two hybrid automatic repeat request (HARQ) feedback modes used for sidelink groupcast communications.
Figure 3A:
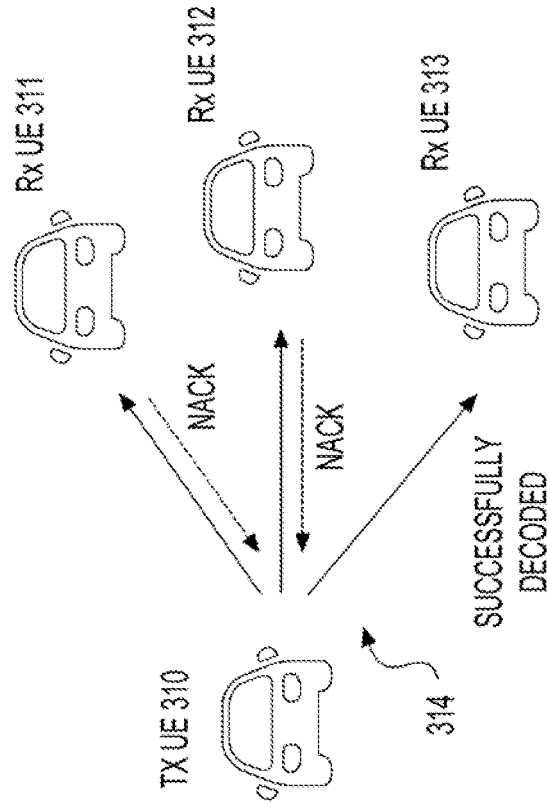

FIGS. 3A-3B show examples of two HARQ feedback modes used for sidelink groupcast communications. FIG. 3A shows a first HARQ feedback mode (Mode 1) where Rx UEs 311-312 share a same HARQ feedback channel (e.g., a physical sidelink feedback channel (PSFCH)) for a transmission 314 from a Tx UE 310. As shown, the Rx UE 313 successfully decoded the transmission 314 without provide a feedback. The Rx UEs 311-312 failed to decode the transmission 314, and each transmits a NACK feedback. However, as the Rx UEs 311-312 share the same HARQ feedback channel, the Tx UE 310 can receive overlapped signals of the NACK feedbacks in the shared HARQ feedback channel but cannot distinguish which of the Rx UE 311, 312, or 313 transmits the NACK feedbacks.

FIG. 3B shows a second HARQ feedback mode (Mode 2) where Rx UEs 321-323 each have a dedicated HARQ feedback channel for a transmission 324 from a Tx UE 320. As shown, the Rx UEs 321-323 can each provide individual ACK or NACK feedbacks. The Tx UE 320 can distinguish the individual ACK or NACK feedbacks. In addition, as each destination Rx UE 321-323 has the dedicated HARQ feedback channel, the Tx UE 320 can recognize a DTX status when no feedback is provided from the respective Rx UE in the respective dedicated HARQ feedback channel.

Figure 4:
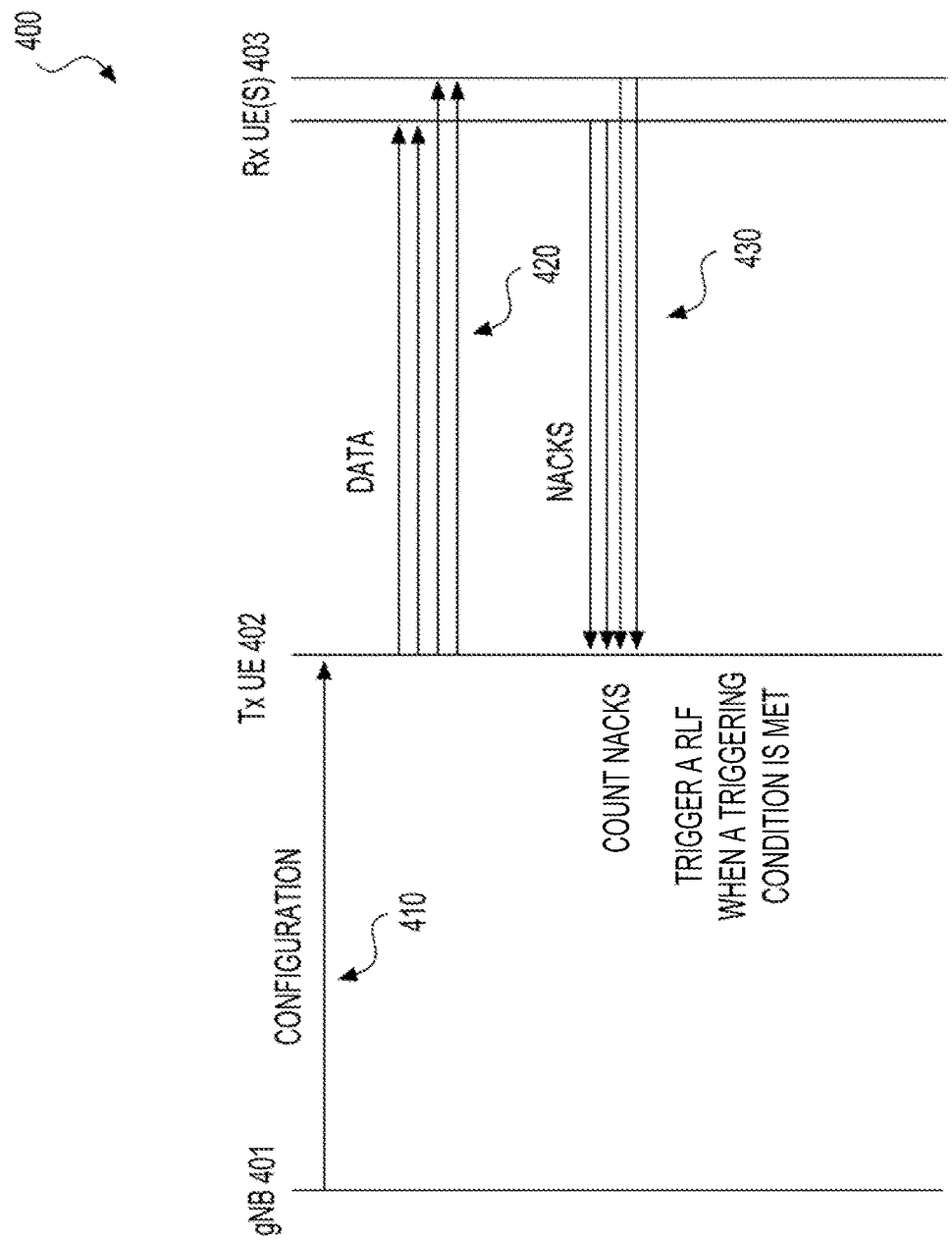
FIG. 4 shows a HARQ NACK status based RLM process 400 according to some embodiments of the disclosure.

FIG. 4 shows a HARQ NACK status based RLM process 400 according to some embodiments of the disclosure. In the process 400, a Tx UE 402 is in coverage of a gNB 401 (in-coverage state) and operates in radio resource control (RRC) connected mode. The Tx UE 402 is in sidelink unicast or groupcast communications with one or more Rx UEs 403. In the process 400, HARQ NACK status are used as HARQ failure indications for triggering a RLF. A count of a number of NACK status (in a consecutive or non-consecutive manner) is maintained for triggering the RLF. The RLM process 400 can include steps S410-S430.

At S410, a configuration is transmitted from the gNB 401 to the Tx UE 402, for example, via RRC signaling. The configuration can include a threshold $TH_{NACK}$ indicating a maximum number of NACK status for triggering the RLF. In other examples (not shown), the $TH_{NACK}$ can be configured to the Tx UE 402 via system information block (SIB) broadcasted from the gNB 401 when the Tx UE 402 is in coverage of the gNB 401 and operates in RRC idle mode or RRC inactive mode. Or, when the Tx UE 402 is in out-of-coverage (OOC) state, the $TH_{NACK}$ preconfigured to the Tx UE 402 can be used. For example, the $TH_{NACK}$ can be predefined and stored at the Tx UE 402, for example, in a universal integrated circuit card (UICC) or a memory at the Tx UE 402.

At S420, the Tx UE 402 can perform multiple data transmissions (unicast for one Rx UE 403, or groupcast for multiple Rx UEs 403). For example, in each data transmission, a PSCCH and a PSSCH scheduled by the PSCCH can be transmitted.

At S430, the Rx UE(s) 403 can transmit HARQ feedbacks to the Tx UE 402. For the scenario where the Tx UE 402 and the multiple Rx UEs 403 operate in HARQ feedback Mode 1, one or more NACKs can be transmitted over a shared HARQ feedback channel. For the scenario where the Tx UE 402 and the multiple Rx UEs 403 operate in HARQ feedback Mode 2, one or more NACKs or ACKs can be transmitted over respective dedicated HARQ feedback channels.

The Tx UE 402 receives the HARQ feedbacks from the Rx UEs 403, and counts a number of received NACKs, for example, by using a counter to maintain a count (denoted by $N_{NACK}$) of the number of received NACKs. The count of the number of received NACKs may increase when new NACKs are received. The count of the number of received NACKs may decrease (but not below zero) or be reset to zero depending on adopted triggering conditions. When the count of the number of the received NACKs reaches or is greater than the configured $TH_{NACK}$ (a trigger condition is met), the RLF can be triggered. The process 400 can be an ongoing process until the RLF is triggered. During the process 400, the transmissions at S420 and the feedbacks at S430 may overlap with each other as time elapses, and the $N_{NACK}$ may fluctuate.

Various NACK status based RLF triggering conditions (corresponding to different counting schemes) can be employed. Corresponding to different NACK status based RLF triggering conditions, a value of the $TH_{NACK}$ can be (pre-)configured differently. Examples of the RLF triggering conditions and the respective counting schemes are described below with reference to FIG. 4.

Embodiment A

In an embodiment, the Tx UE 402 and the Rx UEs 403 operate in HARQ feedback Mode 1. When the Tx UE 402 receives a NACK feedback, the count of the number of received NACKs, $N_{NACK}$, can be increased by 1. Otherwise, when no NACK feedback is received, $N_{NACK}$ can be decreased by 1. As described, the $N_{NACK}$ is maintained to be non-negative. When the $N_{NACK}$ exceeds the $TH_{NACK}$, the RLF can be triggered.

Embodiment B

In an embodiment, the Tx UE 402 and the Rx UEs 403 operate in HARQ feedback Mode 1. When the Tx UE 402 receives a NACK feedback, the count of the number of received NACKs, $N_{NACK}$, can be increased by 1. Otherwise, when no NACK feedback is received, the $N_{NACK}$ can be reset to zero. When the $N_{NACK}$ exceeds the $TH_{NACK}$, the RLF can be triggered. In embodiment B, HARQ NACK status are used as HARQ failure indications, and the RLF is triggered when a number of consecutive received HARQ NACK status reaches the maximum value, $TH_{NACK}$.

Embodiment C

In an embodiment, the Tx UE 402 and the Rx UEs 403 operate in HARQ feedback Mode 2. Accordingly, the Tx UE 402 can monitor the dedicated HARQ feedback channels corresponding to each Rx UE 403 for reception of ACKs or NACKs. When L1 number of NACK feedbacks are received (L1 can be a positive integer), the count of the number of received NACKs, $N_{NACK}$, can be increased by L1. When K1 number of ACK feedbacks are received (K1 can be a positive integer), $N_{NACK}$ can be decreased by K1. As described, the $N_{NACK}$ is maintained to be non-negative. When the $N_{NACK}$ exceeds the $TH_{NACK}$, the RLF can be triggered.

Embodiment D

In an embodiment, the Tx UE 402 and the Rx UEs 403 operate in HARQ feedback Mode 2. Accordingly, the Tx UE 402 can monitor the dedicated HARQ feedback channels corresponding to each Rx UE 403 for reception of ACKs or NACKs. When L2 number of NACK feedbacks am received (L2 can be a positive integer), the count of the number of received NACKs, $N_{NACK}$, can be increased by 1. When at least one ACK feedback is received, $N_{NACK}$ can be decreased by 1. As described, the $N_{NACK}$ is maintained to be non-negative. For example, in embodiment D, corresponding to one transmission from the Tx UE 402, when no ACK is received, the $N_{NACK}$ can increase by 1. When the $N_{NACK}$ exceeds the $TH_{NACK}$, the RLF can be triggered.

Embodiment E

In an embodiment, the Tx UE 402 and the Rx UEs 403 operate in HARQ feedback Mode 2. Accordingly, the Tx UE 402 can monitor the dedicated HARQ feedback channels corresponding to each Rx UE 403 for reception of ACKs or NACKs. When L3 number of NACK feedbacks are received (L3 can be a positive integer), the count of the number of received NACKs, $N_{NACK}$, can be increased by L3. When at least one ACK feedback is received, $N_{NACK}$ can be reset to 0. As described, the $N_{NACK}$ is maintained to be non-negative. In embodiment E, when ACK feedbacks are consecutively not received for a number of data transmissions from the Tx UE 402, the $N_{NACK}$ can continuously increase. When the $N_{NACK}$ exceeds the $TH_{NACK}$, the RLF can be triggered.

Embodiment F

In an embodiment, the Tx UE 402 and the Rx UEs 403 operate in HARQ feedback Mode 2. Accordingly, the Tx UE 402 can monitor the dedicated HARQ feedback channels corresponding to each Rx UE 403 for reception of ACKs or NACKs. When L4 number of NACK feedbacks are received (L4 can be a positive integer), the count of the number of received NACKs, $N_{NACK}$, can be increased by 1. When at least one ACK feedback is received, $N_{NACK}$ can be reset to 0. As described, the $N_{NACK}$ is maintained to be non-negative. In embodiment F, when ACK feedbacks are consecutively not received for a number of data transmissions from the Tx UE 402, the $N_{NACK}$ can continuously increase. When the $N_{NACK}$ exceeds the $TH_{NACK}$, the RLF can be triggered.

Embodiment G

In an embodiment, the Tx UE 402 performs unicast communications with a single destination Rx UE 403. Or, the Tx UE 402 performs groupcast communication with the group of target UEs including only one Rx UE 403, which is an equivalent of unicast. The HARQ NACK based RLF triggering condition and the corresponding counting scheme in embodiment G can be similar to those in embodiments A-F but with only one Rx UE 403.

For example, the Tx UE 402 and the Rx UE 403 can operate in HARQ feedback Mode 1. The Tx UE 402 can receive a NACK or a no-feedback over a HARQ feedback channel for each transmission to the Rx UE 403. When a NACK is received, the $N_{NACK}$ can increase by 1, while when a no-feedback is received, the $N_{NACK}$ can be decreased by 1, or reset to zero, depending on the adopted counting scheme. Corresponding to the scenario of resetting to zero, the $N_{NACK}$ can represent a count of consecutive received HARQ NACK status. The RLF can be triggered when the number of consecutive received HARQ NACK status (used as HARQ failure indications) reaches a maximum number, $TH_{NACK}$.

For example, the Tx UE 402 and the Rx UE 403 can operate in HARQ feedback Mode 2. The Tx UE 402 can receive a NACK or ACK over a dedicated HARQ feedback channel for each transmission to the Rx UE 403. When a NACK is received, the $N_{NACK}$ can increase by 1, while an ACK is received, the $N_{NACK}$ can be decreased by 1, or reset to zero, depending on the adopted counting scheme. Corresponding to the resetting operation, the $N_{NACK}$ can represent a count of consecutive received HARQ NACK status. The RLF can be triggered when the number of consecutive received HARQ NACK status (used as HARQ failure indications) reaches a maximum number, $TH_{NACK}$.

Embodiment G1

In an embodiment, the Tx UE 402 communicates with J number of the Rx UEs 403 in HARQ feedback Mode 2, instead of counting a number of received HARQ NACKs or ACKs, a ratio can be counted. For example, the ratio can be defined to be a ratio of the received NACKs to the number of expected HARQ feedbacks (the J number of the Rx UEs 403). For example, when M number of NACKs are received, the ratio of received NACKs can be M/J, which is counted into the $N_{NACK}$. Similarly, the received ACKs can also be counted in form of the ratio that is defined to be a ratio of the received ACKs to the J number of the Rx UEs 403.

In an example, both the NACKs and ACKs are counted in form of the ratio. For each transmission from the Tx UE 402, when NACKs are received, a corresponding ratio is determined and added to the $N_{NACK}$, while when ACKs are received, a corresponding ratio is determined and subtracted from the $N_{NACK}$. The RLF can be triggered when the $N_{NACK}$ exceeds the $TH_{NACK}$.

Figure 5:
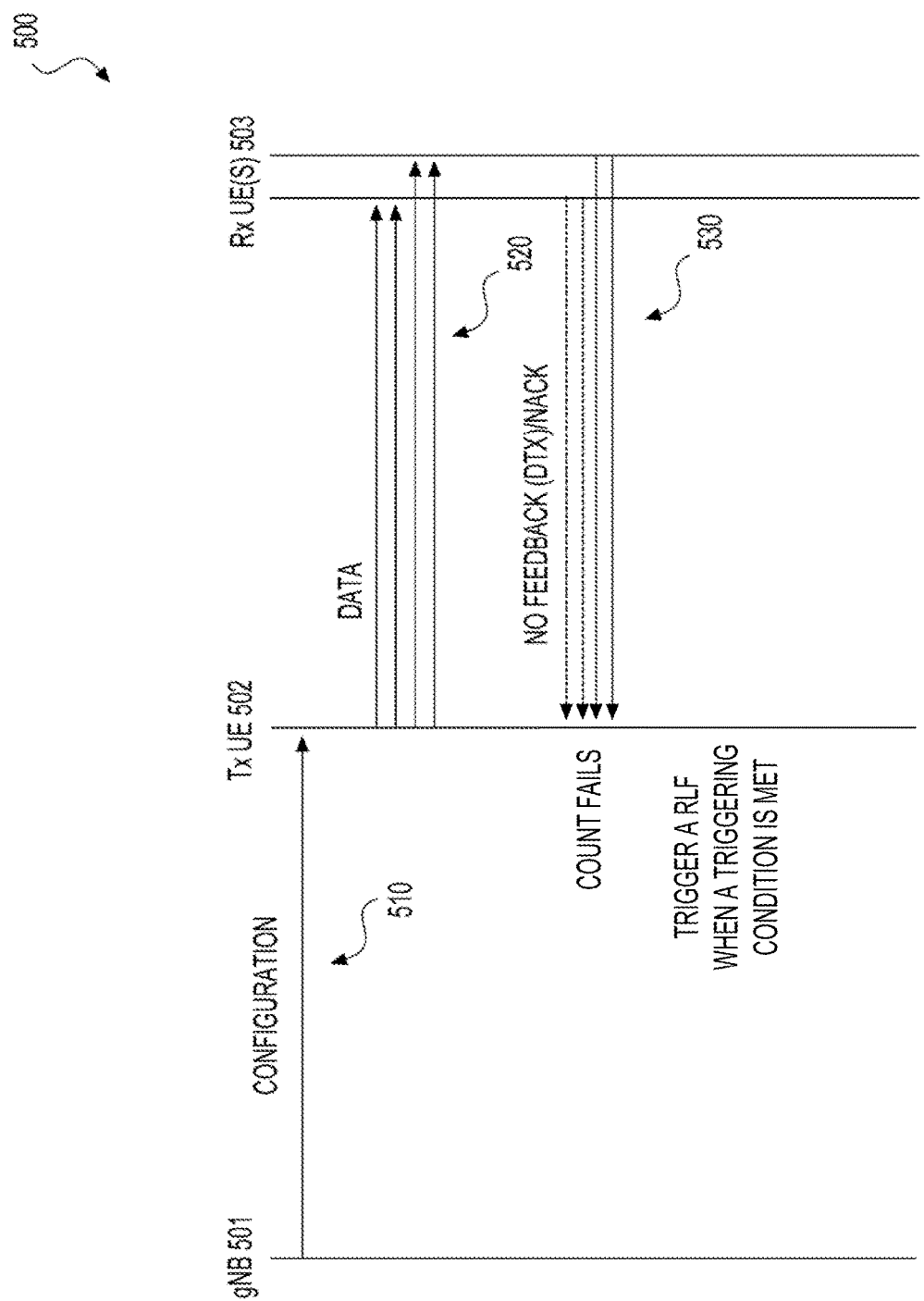
FIG. 5 shows a HARQ NACK/DTX status based RLM process 500 according to some embodiments of the disclosure.

FIG. 5 shows a HARQ NACK/DTX status based RLM process 500 according to some embodiments of the disclosure. In the RLM process 500, a Tx UE 502 is in coverage of a gNB 501 (in-coverage state) and operate in radio resource control (RRC) connected mode. The Tx UE 502 is in sidelink unicast or groupcast communications with one or more Rx UEs 503. The Tx UE 502 and the Rx UEs 503 are operate in HARQ feedback Mode 2. In the process 500, HARQ NACK and/or DTX status are used as HARQ failure indications for triggering a RLF. A count of a number of NACK status and/or DTX status (in a consecutive or non-consecutive manner) is maintained for triggering the RLF. The RLM process 500 can include steps S510-S530.

At S510, a configuration is transmitted from the gNB 501 to the Tx UE 502, for example, via RRC signaling. The configuration can include a threshold $TH_{FAIL}$ indicating a maximum number of NACK status and DTX status or a maximum number of DTX status for triggering the RLF. In other examples (not shown), the $TH_{FAIL}$ can be configured to the Tx UE 502 via system information block (SIB) broadcasted from the gNB 501 when the Tx UE 502 is in coverage of the gNB 501 but in RRC idle mode or RRC inactive mode. Or, the $TH_{FAIL}$ can be preconfigured to the Tx UE 502 that is in out-of-coverage (OOC) state. For example, the $TH_{FAIL}$ can be predefined and stored at the Tx UE 502, for example, in a universal integrated circuit card (UICC) or a memory at the Tx UE 502.

At S520, the Tx UE 502 can perform multiple data transmissions (unicast for one Rx UE 503, or groupcast for multiple Rx UEs 503). For example, in each data transmission, a PSCCH and a PSSCH scheduled by the PSCCH can be transmitted.

At 530, the Rx UE(s) 503 can transmit HARQ feedbacks to the Tx UE 502. As the Tx UE 502 and the Rx UEs 503 can operate in HARQ feedback Mode 2, one or more NACKs or ACKs can be transmitted over respective dedicated HARQ feedback channels. In addition, when some of the Rx UEs 503 fail to detect the PSCCH, those Rx UEs 503 may not provide a NACK or ACK feedback (no feedback is provided). Accordingly, at the Tx UE 502, DTX status corresponding to those Rx UEs 503 can be provided from the PHY layer to the MAC layer. In FIG. 5, the dash lines represent NACK or DTX status.

The Tx UE 502 receives the HARQ feedbacks or no-feedbacks from the respective Rx UEs 503, and counts a number of received NACK and DTX status, or a number of DTX status, for example, by using a counter to maintain a count (denoted by $N_{FAIL}$) of the number of received NACK and DTX status or the number of received DTX status. The count of the number of received NACKs and DTXs or the number of received DTXs may increase when new NACKs or DTXs are received. The count of the number of received NACKs and DTXs or the number of received DTXs may decrease (but not below zero) or be reset to zero depending on adopted triggering conditions. When the count of the number of the received NACKs and DTXs or the number of received DTXs reaches or is greater than the configured $TH_{FAIL}$ (a trigger condition is met), the RLF can be triggered. The transmissions at S520 and the feedback at S530 may overlap with each other as time elapses, and the process 500 can be an ongoing process until the RLF is triggered.

Various NACK/DTX status based RLF triggering conditions (corresponding to different counting schemes) can be employed when the Tx UE 502 and the Rx UEs 503 operate in HARQ feedback mode 2. Corresponding to different NACK/DTX status based RLF triggering conditions, a value of the $TH_{FAIL}$ can be (pre-)configured differently. Examples of the RLF triggering conditions and the respective counting schemes are described below with reference to FIG. 5.

In the following descriptions, the counting schemes in embodiments of H1-M1 are based on received NACK and DTX status. The counting schemes in embodiments of H2-M2 are based on received DTX status.

Embodiment H1

In an embodiment, the Tx UE 502 can monitor the dedicated HARQ feedback channels corresponding to each Rx UE 503 for reception of ACKs, NACKs, or no-feedbacks. When L1 number of NACK or no-feedbacks are received (L1 can be a positive integer), the count of the number of received NACKs and DTXs, $N_{FAIL}$, can be increased by L1. When K1 number of ACK feedbacks are received (K1 can be a positive integer), $N_{FAIL}$ can be decreased by K1. As described, the $N_{FAIL}$ is maintained to be non-negative. When the $N_{FAIL}$ exceeds the $TH_{FAIL}$, the RLF can be triggered.

Embodiment I1

In an embodiment, the Tx UE 502 can monitor the dedicated HARQ feedback channels corresponding to each Rx UE 503 for reception of ACKs, NACKs, or no-feedbacks. When L2 number of NACK feedbacks or no-feedbacks are received (L2 can be a positive integer), the count of the number of received NACKs and DTXs, $N_{FAIL}$, can be increased by 1. When at least one ACK feedback is received, $N_{FAIL}$ can be decreased by 1. As described, the $N_{FAIL}$ is maintained to be non-negative. For example, in embodiment I1, corresponding to one transmission from the Tx UE 502, when no ACK is received, the $N_{FAIL}$ can increase by 1. When the $N_{FAIL}$ exceeds the $TH_{FAIL}$, the RLF can be triggered.

Embodiment J1

In an embodiment, the Tx UE 502 can monitor the dedicated HARQ feedback channels corresponding to each Rx UE 503 for reception of ACKs, NACKs, or no-feedbacks. When L3 number of NACK or no-feedbacks are received (L3 can be a positive integer), the count of the number of received NACKs and DTXs, $N_{FAIL}$, can be increased by L3. When at least one ACK feedback is received, $N_{FAIL}$ can be reset to 0. As described, the $N_{FAIL}$ is maintained to be non-negative. In embodiment J1, when ACK feedbacks are consecutively not received for a number of data transmissions from the Tx UE 502, the $N_{FAIL}$ can continuously increase. When the $N_{FAIL}$ exceeds the $TH_{FAIL}$, the RLF can be triggered.

Embodiment K1

In an embodiment, the Tx UE 502 can monitor the dedicated HARQ feedback channels corresponding to each Rx UE 503 for reception of ACKs, NACKs, or no-feedbacks. When L4 number of NACK or no-feedbacks are received (L4 can be a positive integer), the count of the number of received NACKs and DTXs, $N_{FAIL}$, can be increased by 1. When at least one ACK feedback is received, $N_{FAIL}$ can be reset to 0. As described, the $N_{FAIL}$ is maintained to be non-negative. In embodiment K1, when ACK feedbacks are consecutively not received for a number of data transmissions from the Tx UE 502, the $N_{FAIL}$ can continuously increase. When the $N_{FAIL}$ exceeds the $TH_{FAIL}$, the RLF can be triggered.

Embodiment L1

In an embodiment, the Tx UE 502 performs unicast communications with a single destination Rx UE 503. Or, the Tx UE 502 performs groupcast communications with a group target UEs including only one Rx UE 503, which is an equivalent of unicast communications. The HARQ NACK/DTX based RLF triggering condition and the corresponding counting scheme in embodiment L1 can be similar to those in embodiments H1-K1 but with only one Rx UE 503.

For example, the Tx UE 502 and the Rx UE 503 can operate in HARQ feedback Mode 2. The Tx UE 502 can receive a NACK, ACK, or no-feedback over a dedicated HARQ feedback channel for each transmission to the Rx UE 503. When a NACK or DTX status is received, the $N_{FAIL}$ can increase by 1, while an ACK is received, the $N_{FAIL}$ can be decreased by 1, or reset to zero, depending on the adopted counting scheme. Corresponding to the scenario of resetting to zero, the $N_{FAIL}$ can represent a count of consecutive received HARQ NACK or DTX status. The RLF can be triggered when the number of consecutive received HARQ NACK or DTX status (used as HARQ failure indications) reaches a maximum number, $TH_{FAIL}$.

Embodiment M1

In an embodiment, the Tx UE 502 communicates with J number of the Rx UEs 503 in HARQ feedback Mode 2, instead of counting a number of received HARQ NACKs, ACKs or no-feedbacks, a ratio can be counted. For example, the ratio can be defined to be a ratio of the received NACK and DTX status to the number of expected HARQ feedbacks (the J number of the Rx UEs 503). For example, when M number of NACKs and DTXs are received, the ratio of received NACKs and DTXs can be M/J, which is counted into the $N_{FAIL}$. Similarly, the received ACKs can also be counted in form of the ratio that is defined to be a ratio of the received ACKs to the J number of the Rx UEs 503.

In an example, both the counting of NACKs/DTXs and the counting of ACKs are in form of the ratio. For each transmission from the Tx UE 502, when NACK or DTX status are received, a corresponding ratio is determined and added to the $N_{FAIL}$, while when ACKs are received, a corresponding ratio is determined and subtracted from the $N_{FAIL}$. The RLF can be triggered when the $N_{FAIL}$ exceeds the $TH_{FAIL}$.

The embodiments H2-M2 described below are based on DTX status that represent the HARQ failure indications.

Embodiment H2

In an embodiment, the Tx UE 502 can monitor the dedicated HARQ feedback channels corresponding to each Rx UE 503 for reception of ACKs, NACKs, or no-feedbacks. When L1 number of no-feedbacks are received (L1 can be a positive integer), the count of the number of received DTX status, $N_{FAIL}$, can be increased by L1. When K number of ACK or NACK feedbacks are received (K1 can be a positive integer), $N_{FAIL}$ can be decreased by K1. As described, the $N_{FAIL}$ is maintained to be non-negative. When the $N_{FAIL}$ exceeds the $TH_{FAIL}$, the RLF can be triggered.

Embodiment I2

In an embodiment, the Tx UE 502 can monitor the dedicated HARQ feedback channels corresponding to each Rx UE 503 for reception of ACKs, NACKs, or no-feedbacks. When L2 number of no-feedbacks are received (L2 can be a positive integer), the count of the number of received DTXs, $N_{FAIL}$, can be increased by 1. When at least one ACK or NACK feedback is received, $N_{FAIL}$ can be decreased by 1. As described, the $N_{FAIL}$ is maintained to be non-negative. For example, in embodiment I2, corresponding to one transmission from the Tx UE 502, when no ACK is received, the $N_{FAIL}$ can increase by 1. When the $N_{FAIL}$ exceeds the $TH_{FAIL}$, the RLF can be triggered.

Embodiment J2

In an embodiment, the Tx UE 502 can monitor the dedicated HARQ feedback channels corresponding to each Rx UE 503 for reception of ACKs, NACKs, or no-feedbacks. When L3 number of no-feedbacks are received (L3 can be a positive integer), the count of the number of received DTXs, $N_{FAIL}$, can be increased by L3. When at least one ACK or NACK feedback is received, $N_{FAIL}$ can be reset to 0. As described, the $N_{FAIL}$ is maintained to be non-negative. In embodiment J1, when ACK and NACK feedbacks are consecutively not received for a number of data transmissions from the Tx UE 502, the $N_{FAIL}$ can continuously increase. When the $N_{FAIL}$ exceeds the $TH_{FAIL}$, the RLF can be triggered.

Embodiment K2

In an embodiment, the Tx UE 502 can monitor the dedicated HARQ feedback channels corresponding to each Rx UE 503 for reception of ACKs, NACKs, or no-feedbacks. When L4 number of no-feedbacks are received (L4 can be a positive integer), the count of the number of received DTXs, $N_{FAIL}$, can be increased by 1. When at least one ACK or NACK feedback is received, $N_{FAIL}$ can be reset to 0. As described, the $N_{FAIL}$ is maintained to be non-negative. In embodiment K2, when ACK and NACK feedbacks are consecutively not received for a number of data transmissions from the Tx UE 502, the $N_{FAIL}$ can continuously increase. When the $N_{FAIL}$ exceeds the $TH_{FAIL}$, the RLF can be triggered.

Embodiment L2

In an embodiment, the Tx UE 502 performs unicast communications with a single destination Rx UE 503. Or, the Tx UE 502 performs groupcast communications with a group target UEs including only one Rx UE 503, which is an equivalent of unicast communications. The HARQ DTX based RLF triggering condition and the corresponding counting scheme in embodiment L2 can be similar to those in embodiments H2-K2 but with only one Rx UE 503.

For example, the Tx UE 502 and the Rx UE 503 can operate in HARQ feedback Mode 2. The Tx UE 502 can receive a NACK, ACK, or no-feedback over a dedicated HARQ feedback channel for each transmission to the Rx UE 503. When a DTX status is received, the $N_{FAIL}$ can increase by 1, while an ACK or NACK is received, the $N_{FAIL}$ can be decreased by 1, or reset to zero, depending on the adopted counting scheme. Corresponding to the scenario of resetting to zero, the $N_{FAIL}$ can represent a count of consecutive received HARQ DTX status. The RLF can be triggered when the number of consecutive received HARQ DTX status (used as HARQ failure indications) reaches a maximum number, $TH_{FAIL}$.

Embodiment M2

In an embodiment, the Tx UE 502 communicates with J number of the Rx UEs 503 in HARQ feedback Mode 2, instead of counting a number of received HARQ NACKs, ACKs or no-feedbacks, a ratio can be counted. For example, the ratio can be defined to be a ratio of the received DTX status to the number of expected HARQ feedbacks (the J number of the Rx UEs 503). For example, when M number of DTXs are received, the ratio of received DTXs can be M/J, which is counted into the $N_{FAIL}$. Similarly, the received ACKs and NACKs can also be counted in form of the ratio that is defined to be a ratio of the received ACKs and NACKs to the J number of the Rx UEs 503.

In an example, both the counting of DTXs and the counting of ACKs/NACKs are in form of the ratio. For each transmission from the Tx UE 502, when DTX status are received, a corresponding ratio is determined and added to the $N_{FAIL}$, while when ACKs and NACKs are received, a corresponding ratio is determined and subtracted from the $N_{FAIL}$. The RLF can be triggered when the $N_{FAIL}$ exceeds the $TH_{FAIL}$.

In the embodiments described herein, corresponding to one transmission from a Tx UE to other Rx UEs, when an operation of resetting $N_{NACK}$ or $N_{FAIL}$ to zero is to-be-performed due to reception of a non-failure indication status (e.g., ACK or NACK), the Tx UE can skip the operation of increasing the $N_{NACK}$ or $N_{FAIL}$ by an integer value or by a ratio if one or more failure indication status are received. In such a way, computation cost can be saved.

Figure 6:
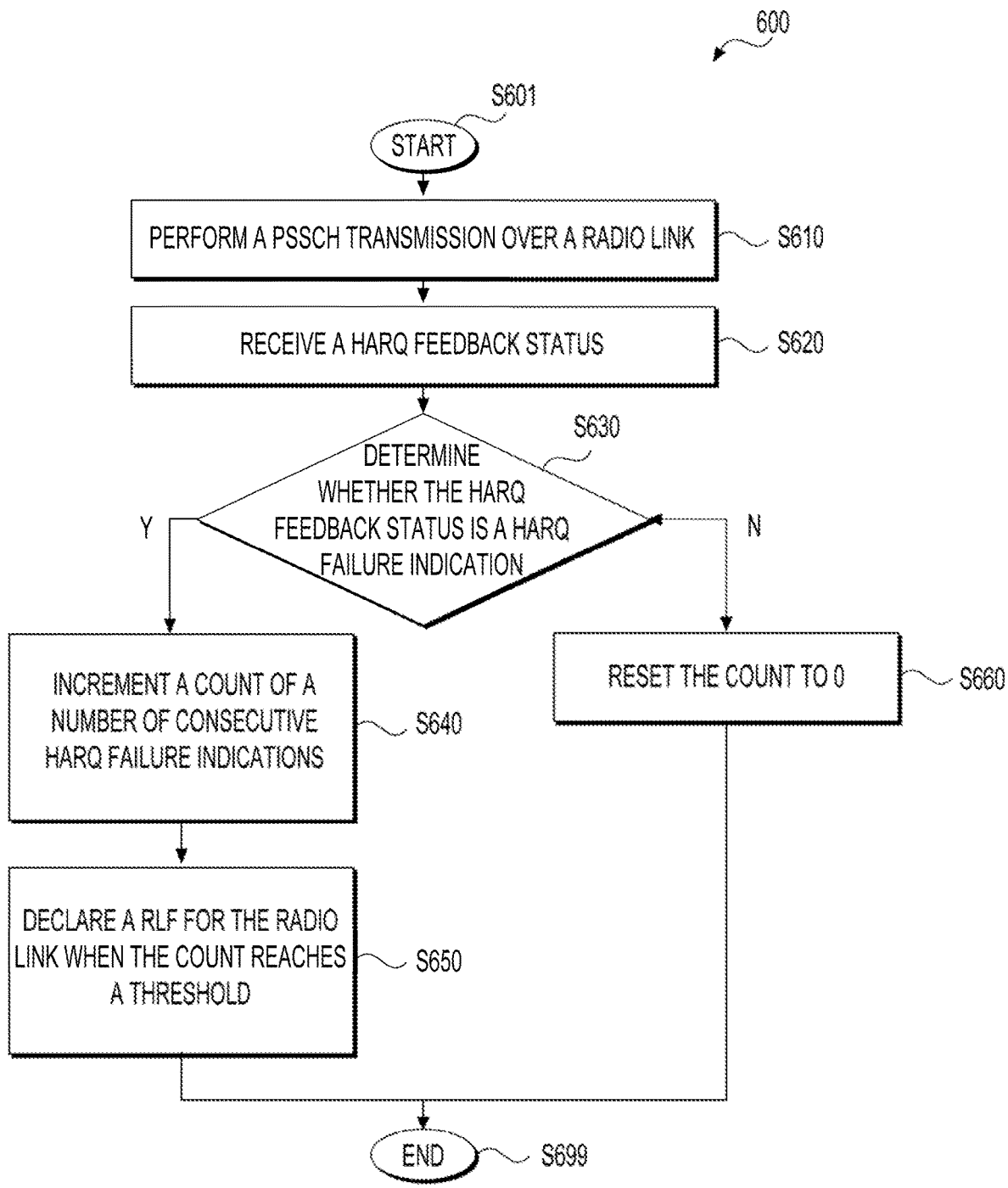
FIG. 6 shows a RLM process 600 according to an embodiment of the disclosure.

FIG. 6 shows a RLM process 600 according to an embodiment of the disclosure. The process 600 is based on one or two HARQ feedback status (e.g., NACK or DTX) used as a RLF indication. The process 600 can be performed to monitor quality of a radio link between a Tx UE and a Rx UE, and to trigger a RLF when a RLF triggering condition is satisfied. The process 600 can start from S601 and proceed to S610.

At S610, a PSSCH transmission is performed over the radio link between the Tx UE and the Rx UE in sidelink communications. The PSSCH can be scheduled by a PSCCH.

At S620, a HARQ feedback status corresponding to the PSSCH transmission can be received from a PHY layer at the Tx UE. For example, a PSFCH can be associated with the PSSCH by configuration or by scheduling of the PSCCH. A HARQ feedback can be provided by the Rx UE to the Tx UE using the PSFCH. The Tx UE can receive the HARQ feedback (ACK NACK or no-feedback) corresponding to the PSSCH transmission at the PHY layer. The PHY layer can provide a corresponding HARQ feedback status (ACK, NACK, or DTX) to an upper layer (e.g., a MAC layer).

At S630, it is determined whether the received HARQ feedback status is a HARQ failure indication. In an example, the DTX status are used as HARQ failure indications. In an example, the NACK status or NACK plus DTX status are used as HARQ failure indications.

At S640, when the received HARQ feedback status is the HARQ failure indication, a count of a number of consecutive HARQ failure indications received for PSSCH transmissions over the radio link between the Tx UE and the Rx UE can be incremented by 1.

At S650, a RLF for the radio link between the Tx UE and the Rx UE can be declared when the count of the number of consecutive HARQ failure indications reaches a threshold. For example, the threshold can be is configured to the Tx UE through RRC signaling, SIB broadcasting, or pre-configuration. In an example, the threshold is indicated by a parameter (denoted by maxNumConsecutiveDTX) received through RRC signaling or SIB broadcasting, or pre-configuration. After the RLF is declared, the Tx UE can stop data transmissions to the Rx UE.

At S660, when the received HARQ feedback status is not the HARQ failure indication, the count of the number of consecutive HARQ failure indications can be reset to 0. The process 600 can proceed to S699, and terminate at S699.

Figure 7:
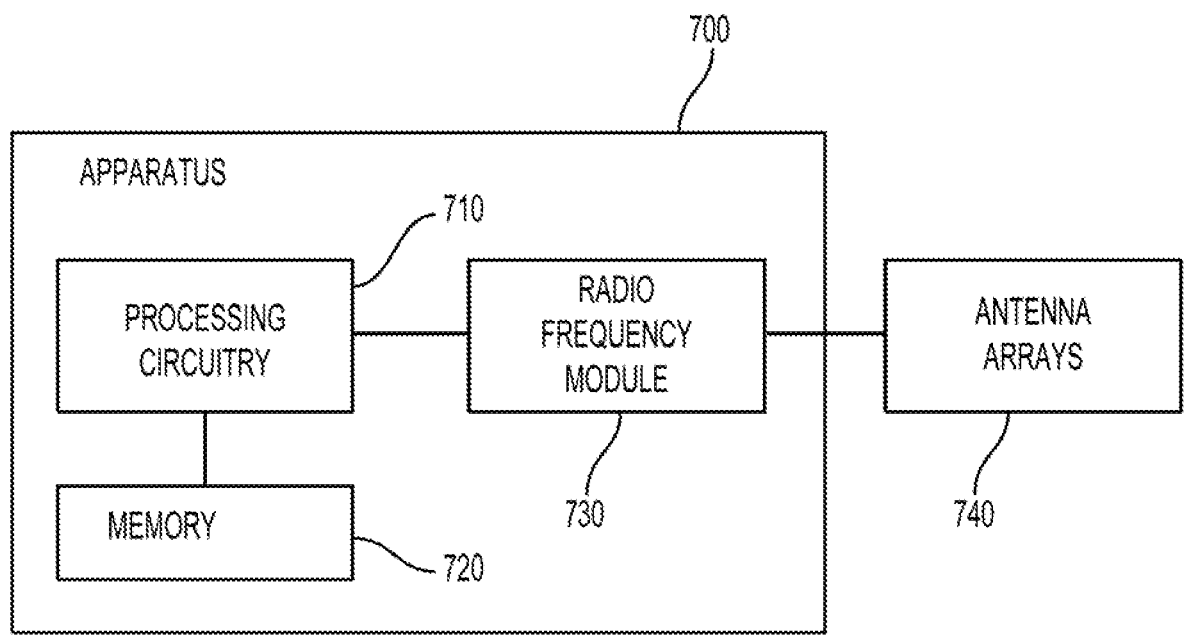
FIG. 7 shows an exemplary apparatus 700 according to embodiments of the disclosure.

FIG. 7 shows an exemplary apparatus 700 according to embodiments of the disclosure. The apparatus 700 can be configured to perform various functions in accordance with one or more embodiments or examples described herein. Thus, the apparatus 700 can provide means for implementation of mechanisms, techniques, processes, functions, components, systems described herein. For example, the apparatus 700 can be used to implement functions of the UEs and the BSs in various embodiments and examples described herein. The apparatus 700 can include a general purpose processor or specially designed circuits to implement various functions, components, or processes described herein in various embodiments. The apparatus 700 can include processing circuitry 710, a memory 720, and a radio frequency (RF) module 730.

In various examples, the processing circuitry 710 can include circuitry configured to perform the functions and processes described herein in combination with software or without software. In various examples, the processing circuitry 710 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 710 can be a central processing unit (CPU) configured to execute program instructions to perform various functions and processes described herein. Accordingly, the memory 720 can be configured to store program instructions. The processing circuitry 710, when executing the program instructions, can perform the functions and processes. The memory 720 can further store other programs or data, such as operating systems, application programs, and the like. The memory 720 can include non-transitory storage media, such as a read only memory (ROM), a random access memory (RAM), a flash memory, a solid state memory, a hard disk drive, an optical disk drive, and the like.

In an embodiment, the RF module 730 receives a processed data signal from the processing circuitry 710 and converts the data signal to beamforming wireless signals that are then transmitted via antenna arrays 740, or vice versa. The RF module 730 can include a digital to analog converter (DAC), an analog to digital converter (ADC), a frequency up converter, a frequency down converter, filters and amplifiers for reception and transmission operations. The RF module 730 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 740 can include one or more antenna arrays.

The apparatus 700 can optionally include other components, such as input and output devices, additional or signal processing circuitry, and the like. Accordingly, the apparatus 700 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
performing a physical sidelink shared channel (PSSCH) transmission over a radio link between a transmitter (Tx) UE and a receiver (Rx) UE in sidelink communications, the Tx UE being configured with multiple HARQ processes for performing PSSCH transmissions;
receiving a hybrid automatic repeat request (HARQ) feedback status corresponding to the PSSCH transmission from a physical layer at the Tx UE;
determining whether the received HARQ feedback status is a HARQ failure indication;
in response to the received HARQ feedback status being the HARQ failure indication, incrementing a count of a number of consecutive HARQ failure indications received for PSSCH transmissions over the radio link between the Tx UE and the Rx UE by 1;
declaring a radio link failure (RLF) for the radio link between the Tx UE and the Rx UE when the count of the number of consecutive HARQ failure indications reaches a threshold, the number of consecutive HARQ failure indications including HARQ failure indications corresponding to different ones of the multiple HARQ processes each configured to transmit a different transport block; and
in response to the received HARQ feedback status being not a HARQ failure indication, resetting the count of the number of consecutive HARQ failure indications to 0.

2. The method of claim 1, wherein the received HARQ feedback status is one of an HARQ ACK, an HARQ NACK, or an HARQ DTX.

3. The method of claim 2, wherein the HARQ DTX is used as the HARQ failure indication.

4. The method of claim 2, wherein the HARQ NACK is used as the HARQ failure indication.

5. The method of claim 2, wherein the HARQ NACK and the HARQ DTX are each used as the HARQ failure indication.

6. The method of claim 1, wherein the radio link between the Tx UE and the Rx UE is associated with a source layer-2 ID corresponding to the Tx UE and a destination layer-2 ID corresponding to the Rx UE.

7. The method of claim 1, wherein the threshold is configured to the Tx UE through RRC signaling, SIB broadcasting, or pre-configuration.

8. An apparatus, comprising circuitry configured to:
perform a physical sidelink shared channel (PSSCH) transmission over a radio link between a transmitter (Tx) UE and a receiver (Rx) UE in sidelink communications, the Tx UE being configured with multiple HARQ processes for performing PSSCH transmissions;
receive a hybrid automatic repeat request (HARQ) feedback status corresponding to the PSSCH transmission from a physical layer at the Tx UE;
determine whether the received HARQ feedback status is a HARQ failure indication;
in response to the received HARQ feedback status being the HARQ failure indication, increment a count of a number of consecutive HARQ failure indications received for PSSCH transmissions over the radio link between the Tx UE and the Rx UE by 1;
declare a radio link failure (RLF) for the radio link between the Tx UE and the Rx UE when the count of the number of consecutive HARQ failure indications reaches a threshold, the number of consecutive HARQ failure indications including HARQ failure indications corresponding to different ones of the multiple HARQ processes each configured to transmit a different transport block; and
in response to the received HARQ feedback status being not a HARQ failure indication, reset the count of the number of consecutive HARQ failure indications to 0.

9. The apparatus of claim 8, wherein the received HARQ feedback status is one of an HARQ ACK, an HARQ NACK, or an HARQ DTX.

10. The apparatus of claim 9, wherein the HARQ DTX is used as the HARQ failure indication.

11. The apparatus of claim 9, wherein the HARQ NACK is used as the HARQ failure indication.

12. The apparatus of claim 9, wherein the HARQ NACK and the HARQ DTX are each used as the HARQ failure indication.

13. The apparatus of claim 8, wherein the radio link between the Tx UE and the Rx UE is associated with a source layer-2 ID corresponding to the Tx UE and a destination layer-2 ID corresponding to the Rx UE.

14. The apparatus of claim 8, wherein the threshold is configured to the Tx UE through RRC signaling, SIB broadcasting, or pre-configuration.

15. A non-transitory computer-readable medium storing instructions that, when executed by a processor, cause the processor to perform a method, the method comprising:
- performing a physical sidelink shared channel (PSSCH) transmission over a radio link between a transmitter (Tx) UE and a receiver (Rx) UE in sidelink communications, the Tx UE being configured with multiple HARQ processes for performing PSSCH transmissions;
- receiving a hybrid automatic repeat request (HARQ) feedback status corresponding to the PSSCH transmission from a physical layer at the Tx UE;
- determining whether the received HARQ feedback status is a HARQ failure indication;
- in response to the received HARQ feedback status being the HARQ failure indication, incrementing a count of a number of consecutive HARQ failure indications received for PSSCH transmissions over the radio link between the Tx UE and the Rx UE by 1;
- declaring a radio link failure (RLF) for the radio link between the Tx UE and the Rx UE when the count of the number of consecutive HARQ failure indications reaches a threshold, the number of consecutive HARQ failure indications including HARQ failure indications corresponding to different ones of the multiple HARQ processes each configured to transmit a different transport block; and
- in response to the received HARQ feedback status being not a HARQ failure indication, resetting the count of the number of consecutive HARQ failure indications to 0.

16. The non-transitory computer-readable medium of claim 15, wherein the received HARQ feedback status is one of an HARQ ACK, an HARQ NACK, or an HARQ DTX.

17. The non-transitory computer-readable medium of claim 16, wherein the HARQ DTX is used as the HARQ failure indication.

18. The non-transitory computer-readable medium of claim 16, wherein the HARQ NACK is used as the HARQ failure indication.

19. The non-transitory computer-readable medium of claim 16, wherein the HARQ NACK and the HARQ DTX are each used as the HARQ failure indication.

20. The non-transitory computer-readable medium of claim 15, wherein the radio link between the Tx UE and the Rx UE is associated with a source layer-2 ID corresponding to the Tx UE and a destination layer-2 ID corresponding to the Rx UE.

* * * * *